July 31, 1928.
R. J. MANDERY
1,679,045
COMBINED SCOOTER, SIDE CAR, AND WAGON
Filed Aug. 18, 1925    2 Sheets-Sheet 1
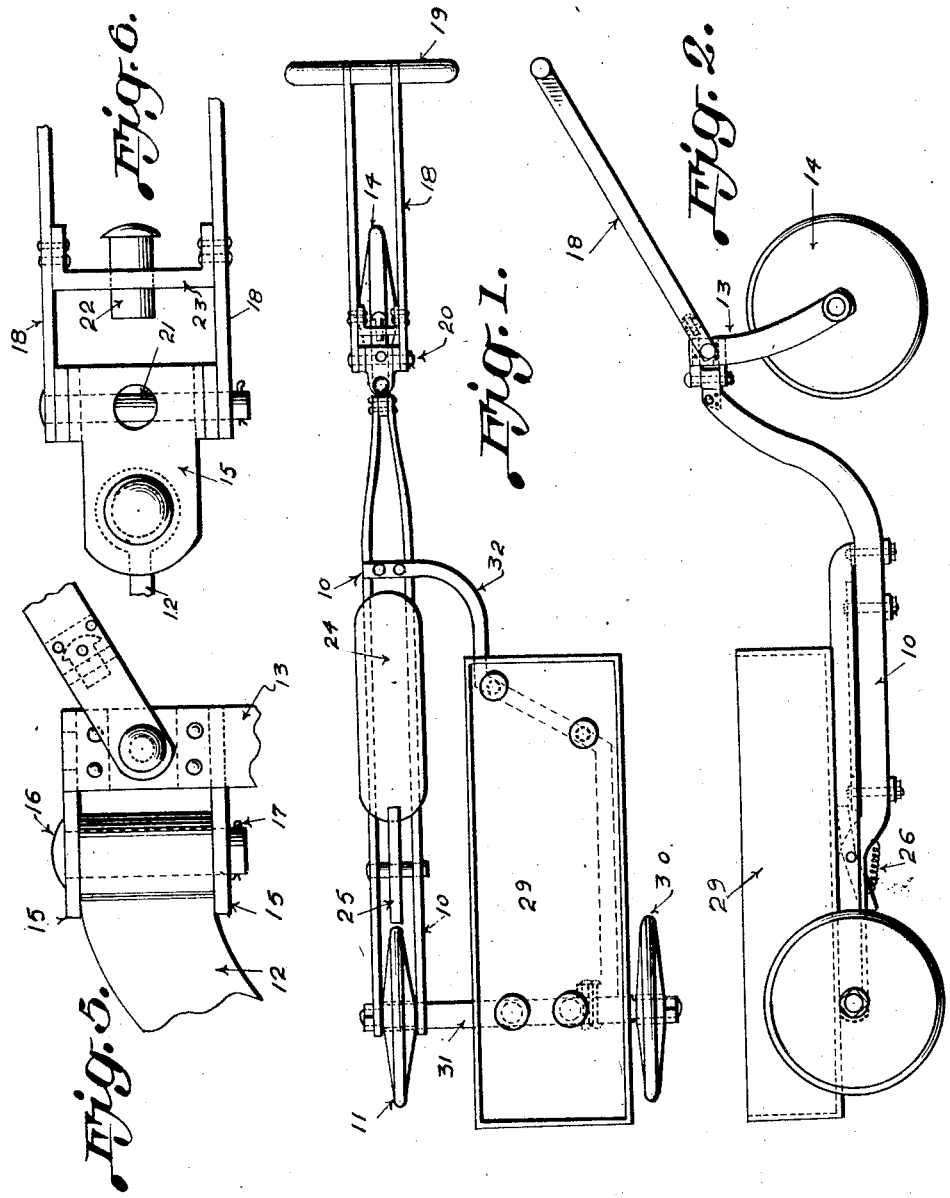
ROY. J. MANDERY    INVENTOR.
BY Emil F. Lange
ATTORNEY

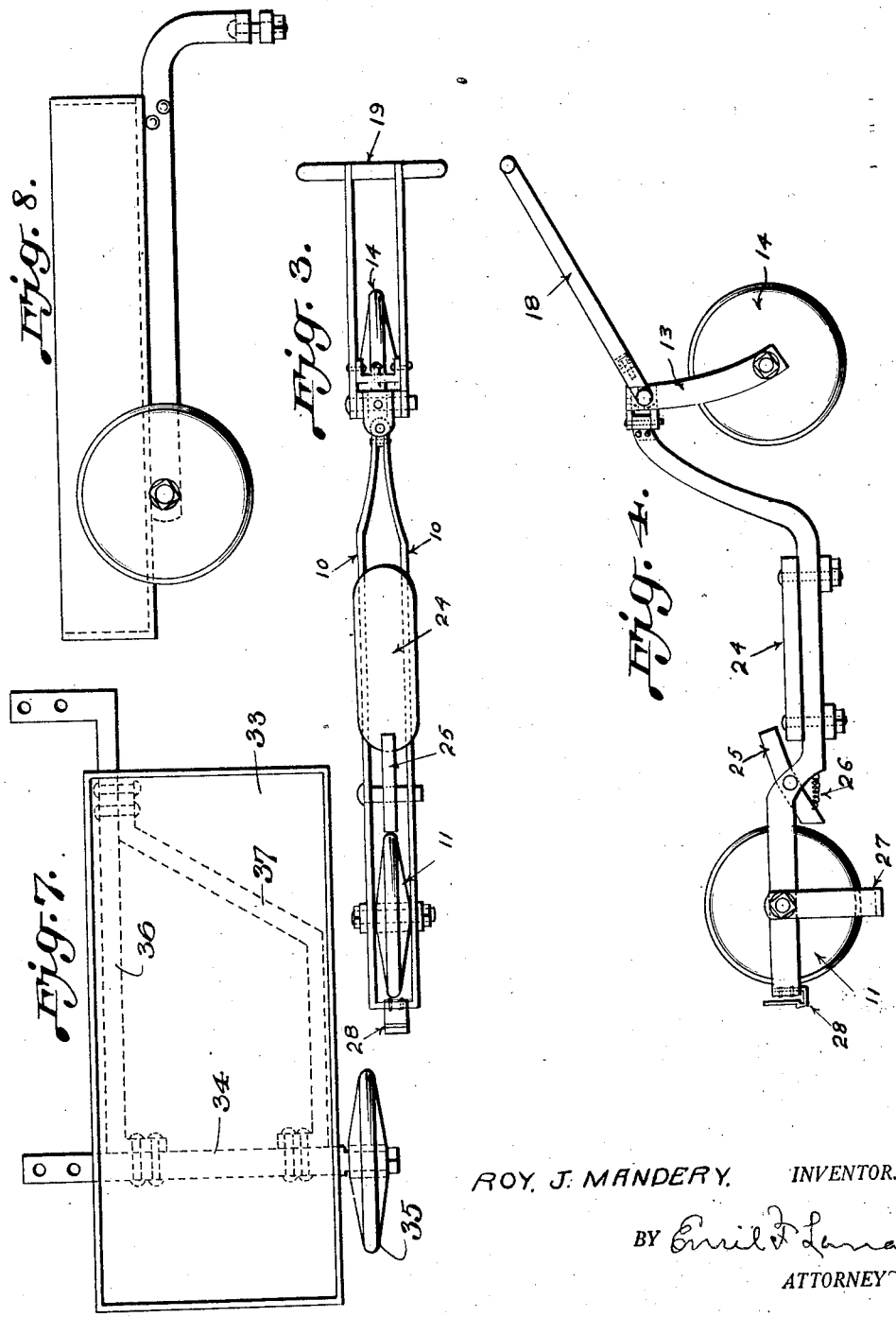

Patented July 31, 1928.

1,679,045

UNITED STATES PATENT OFFICE.

ROY J. MANDERY, OF LINCOLN, NEBRASKA.

COMBINED SCOOTER, SIDE CAR, AND WAGON.

Application filed August 18, 1925. Serial No. 50,987.

My invention relates to toy vehicles and its object is the provision of a vehicle which may be used as a scooter alone or as a scooter with side car or as a wagon. In connection with such a vehicle it is my purpose to embody certain improvements in the details of the scooter and side car. Other objects will be pointed out in the following description.

Referring now to the drawings,

Figure 1 is a plan view of the combined scooter and side car which is so constructed that it may be used as a wagon.

Figure 2 is a side elevation of the parts shown in Figure 1.

Figure 3 is a plan view of the scooter alone and showing also the support for maintaining it in its upright position when it is not in use.

Figure 4 is a side elevation of the scooter shown in Figure 3.

Figure 5 is a side elevation of the joints between the front and rear portions of the scooter and the front portion and the handle of the scooter.

Figure 6 is a plan view of the parts shown in Figure 5.

Figures 7 and 8 are plan view and side elevation respectively of a modified form of the side car.

The rear portion of the frame of the scooter comprises two side bars 10 which are parallel to each other throughout the greater portion of their length but which converge at their forward extremities. These side bars 10 may be separate as shown in Figure 1 or they may be made by bending a single piece of strap iron into U-form as shown in Figure 3. Forward of the rear wheel the side bars 10 are bent downwardly and at their forward converging ends they are bent into the goose neck form shown in Figures 2 and 4. The rear wheel 11 is secured between the side bars 10 to a shaft or axle which is journalled in the side bars. At their forward converging ends the side bars are bolted or otherwise connected together with the tongue of the socket member 12 between them. The forward portion of the scooter includes two side members 13 which are upwardly and rearwardly inclined, having the axle or shaft of the front wheel 14 secured in the lower extremities. At their upper ends the side members 13 are bolted or otherwise secured together with rearwardly projecting plates 15 between them. The plates 15 are apertured for receiving the pin 16 which also passes through the socket member 12. The plates 15 are spaced so as to permit free movement of the socket member 12 between them. Displacement of the bolt 16 is prevented by inserting a cotter pin 17 through an aperture in the lower end of the bolt. The handle 18 is formed of two members which straddle the side members 13 and which are provided at their free ends with a hand grip 19. The side members 18 are joined to the side members 13 by means of a horizontal pivot pin 20. When the scooter is to be pulled the handle 18 is in the position shown in the drawings, but when it is to be used as a scooter the handle must have a more or less fixed and upright position. As a means for locking it in such a position there is provided an aperture 21 in the upper plate 15 and a slidable bolt 22 which is adapted to enter the socket 21. The bolt 22 passes through a brace member 23 connecting the side members 18. The bolt member 22 may be provided with any desirable means for preventing its accidental displacement while the vehicle is in use. The depressed portions of the side bars 10 support the foot rest 24. Between the foot rest 24 and the rear wheel 11 is a pivoted brake 25 which projects slightly over the rear end of the foot rest so that it may readily be engaged by the child's heel when coasting or when it is otherwise desired to suddenly stop or slow down the vehicle. The brake is normally held in its inoperative position by means of a coil spring 26 connecting the brake to one of the side bars 10.

As before stated, the frame of the rear portion of the scooter may be made in U-shape as shown in Figure 3. When in this shape the frame can much better withstand the torsional strains to which a scooter frame is normally subjected. When the scooter is used alone it is desirable that the scooter be provided with means for maintaining it in upright position when it is parked. In Figures 3 and 4 is shown a bail 27 which is pivoted to the axle of the wheel 11 for supporting the rear end of the scooter, and which may be swung into engagement with the spring latch 28 when the scooter is to be used.

My preferred form of side car is shown in Figures 1 and 2. This comprises a box 29 with a side wheel 30 and means for securing it as an attachment to the scooter. The wheel 30 is journalled on a shaft 31 which is rigidly secured to the box 29. The support 32 is rigidly secured both to the axle 31 and to the box 29 and it is provided with means for releasably securing it to the side bars 10 forward of the foot rest 24. In attaching the side car to the scooter the axle of the wheel 11 is first removed and the free end of the axle 31 is then inserted to support the wheel 11 in the side bars 10. The forward end of the brace member 32 is then secured to the side bars 10 as shown in Figure 1.

In Figures 7 and 8 is shown a slight modification of the side car. In this case the box 33 has an axle 34 with one wheel 35. The brace 36 projects forwardly from the axle 34 while the brace 37 connects the forward portion of the brace 36 with the axle 34. Both the axle 34 and the brace 36 are provided with laterally extending projections which are adapted to pass over the side members 10 of the scooter and to be secured thereto. The side car shown in Figures 7 and 8 is more rugged and better braced than the side car shown in Figures 1 and 2, and it may be secured to the scooter without removing the rear wheel of the scooter.

The scooter and side car may be made and sold either separately or together. As a scooter it has the advantage of being easily steered, and the control through the brake makes it easy to stop or to slow down the scooter when the traffic conditions make such action necessary. The side car may be used for holding a smaller child or for carrying parcels. This can easily be done by the child when he is operating the scooter in the usual way. If the child however, prefers to use the vehicle as a wagon, he simply releases the bolt 22 from the socket, which gives him a pivoted handle for pulling the vehicle.

Having thus described my invention in such full, clear, and exact terms that its construction and operation will be readily understood by others skilled in the art to which it pertains, what I claim as new and desire to secure by Letters Patent of the United States is:

A scooter having a narrow elongated frame consisting of a pair of spaced apart beams, said beams being horizontally positioned and parallel throughout the major portion thereof and being converging and upwardly and forwardly inclined in their forward portions, a front wheel support pivotally secured to said beams at their forward extremities, said wheel support being forked and having a supporting wheel journalled therein, a handle member pivotally secured to said wheel support at the upper extremity thereof, means for releasably latching said handle member in substantially vertical position, a foot rest secured to said beams, a rear supporting wheel journalled to said beams at the rear extremities thereof, and a side car for said scooter, said side car including a box, an axle secured to said box and projecting beyond both sides thereof, said axle being adapted to be passed through the hub of said rear supporting wheel of said scooter, a supporting wheel journalled on said axle at the outer extremity thereof, and a reinforcing member on the under side of said box and extending forwardly from said axle and then inwardly and having a clip member adapted to straddle both of said beams forward of said foot rest to be releasably secured to said beams.

In witness whereof I affix my signature.

ROY J. MANDERY.